United States Patent [19]

Buchwald et al.

[11] Patent Number: 5,300,253
[45] Date of Patent: Apr. 5, 1994

[54] 1-CHLORO-2,2,2-TRIFLUOROETHYL DIFLUOROMETHYL ETHER COMPOSITIONS FOR REMOVING WATER FROM SURFACES

[75] Inventors: Hans Buchwald, Ronnenberg; Joachim Hellmann, Hanover; Boleslaus Raszkowski, Wiedensahl, all of Fed. Rep. of Germany; Pierre Barthelemy, Jodoigne; Mireille Paulus, Brussels, both of Belgium

[73] Assignee: Solvay Fluor und Derivate GmbH, Hanover, Fed. Rep. of Germany

[21] Appl. No.: 922,528

[22] Filed: Jul. 31, 1992

[30] Foreign Application Priority Data

Jul. 31, 1991 [DE] Fed. Rep. of Germany ....... 4125274

[51] Int. Cl.$^5$ ................................................ C09K 3/18
[52] U.S. Cl. ..................................... 252/194; 252/364
[58] Field of Search ................................. 252/364, 194

[56] References Cited

U.S. PATENT DOCUMENTS

| | | | |
|---|---|---|---|
| 3,397,150 | 8/1968 | Burt et al. | 252/194 |
| 3,846,332 | 11/1974 | Croix | 252/364 |
| 4,182,687 | 1/1980 | Bartlett | 252/194 |
| 4,594,177 | 6/1986 | Lantz et al. | 252/194 |

Primary Examiner—Robert L. Stoll
Assistant Examiner—Valerie Fee
Attorney, Agent, or Firm—Evenson, McKeown, Edwards & Lenahan

[57] ABSTRACT

A composition composed of 1-chloro-2,2,2-trifluoroethyl difluoromethyl ether and at least one surface-active substance and the use of such a composition for removing water from surfaces of objects of diverse material and type are described.

11 Claims, No Drawings

1-CHLORO-2,2,2-TRIFLUOROETHYL DIFLUOROMETHYL ETHER COMPOSITIONS FOR REMOVING WATER FROM SURFACES

BACKGROUND OF THE INVENTION

The present invention relates to compositions composed of 1-chloro-2,2,2-trifluoroethyl difluoromethyl ether and to the use of these compositions for the removal of water from the surfaces of objects of the most diverse type and from the most diverse materials.

In many processing and cleaning operations, for example in the electrical or electronics industry, the optics industry, or the mechanical industry during production of high-quality precision workpieces, objects come into contact intentionally or unintentionally with water or moisture. Consequently, water may adhere to these objects (for example as a film of moisture). However, the presence of the adhering water can have an adverse effect on further processing steps and/or on the functional capacity and service life of the objects. It is therefore necessary for many objects to be freed completely from adhering water immediately after the processing or cleaning operations which include the presence of water, or even after mere contact with atmospheric moisture and the like, before further processing or for functionally correct use.

The removal of water from objects is also referred to below as "drying". In the prior art, depending on the nature of the objects, they are dried by heating or by treatment with certain solvent compositions ("drying compositions") containing, for example, hydrocarbons, acetone, alcohols or completely halogenated fluorochlorohydrocarbons, which also contain surface-active substances. Since the objects to be dried can consist of the most diverse materials, for example of plastics, glass, metals or combinations thereof, the drying processes and the drying compositions used for drying must be compatible with a large number of materials However, drying by heating generally involves undesirably severe exposure of the drying objects to heat, or is unsuitable for a large number of materials because of the high temperatures which must be used. Also, in many cases it is not possible to dry in this way without leaving spots. In turn, the constituents in the drying compositions, especially the solvent which constitutes the main component, should be inert towards a large number of the most diverse materials.

Although many efforts have already been made to develop drying compositions having the desired properties for various fields of use and for various materials, such as, for example, a high drying action and drying quality and good inertness towards the objects to be dried, known compositions do not always exhibit the required technical and/or toxicological and/or ecological properties. For example, known prior art compositions frequently do not exhibit, or only inadequately exhibit, the high degree of inertness, drying action and drying quality which are required. Other known compositions comprise relatively large amounts of solvents which are toxicologically unacceptable or present possible safety hazards (e.g. due to their low flash points). Still other compositions comprise solvent constituents which, because of possible adverse effects on the environment, it is desirable to replace by other solvents which are at least equally suitable for the particular intended uses. Thus, there remains a need for new drying compositions having improved properties, which also exhibit better toxicological and/or environmental acceptability.

SUMMARY OF THE INVENTION

It is therefore the object of the invention to provide new compositions for removing water from (drying) the surfaces of objects which exhibits good technical drying properties with a decreased tendency to leave spots.

Another object of the invention is to provide a composition for removing water from the surfaces of objects which is relatively non-toxic.

A further object of the invention is to provide a composition for removing water from the surfaces of objects which is more ecologically acceptable than prior art compositions.

These and other object of the invention are achieved by providing a composition of matter consisting essentially of 99.99 to 90% by weight of 1-chloro-2,2,2-trifluoroethyl difluoromethyl ether and 0.01 to 10% by weight of at least one surface-active substance dissolved in said ether, the sum of the constituents being 100% by weight.

In accordance with a further preferred aspect of the invention the objects are also achieved by providing a process for removing water from a surface of an object, said process comprising treating said surface with a composition consisting essentially of 99.99 to 90% by weight of 1-chloro-2,2,2-trifluoroethyl difluoromethyl ether and 0.01 to 10% by weight of at least one surface-active substance dissolved in said ether, the sum of the constituents being 100% by weight.

DETAILED DESCRIPTION OF PREFERRED EMBODIMENTS

The invention relates to new compositions which are distinguished by a content of 99.99 to 90% by weight of 1-chloro-2,2,2-trifluoroethyl difluoromethyl ether and 0.01 to 10% by weight of a surface-active substance dissolved therein, or a mixture of these surface-active substances, the sum of the constituents being 100% by weight.

In a preferred embodiment of the invention, the compositions contain 99.95 to 95% by weight of 1-chloro-2,2,2-trifluoroethyl difluoromethyl ether and 0.05 to 5% by weight of the surface-active substance.

The drying compositions of the invention can contain any surface-active substance which is soluble in solvents (that is to say in this case soluble in 1-chloro-2,2,2-trifluoroethyl difluoromethyl ether) and which facilitates displacement or removal of water from the surfaces of the objects to be dried by the 1-chloro-2,2,2-trifluoroethyl difluoromethyl ether. In advantageous embodiments of the compositions according to the invention, such surface-active substances are selected from the group consisting of surface-active organic amine, ammonium and amide compounds, surface-active organic acids, surface-active phosphoric acid esters, salts of a) surface-active organic amine, ammonium or amide compounds with b) surface-active organic acids or phosphoric acid monoesters or diesters, and mixtures thereof.

The surface-active organic amine compounds within the scope of the invention can be derived from mono- and diamine compounds. Suitable compounds from the monoamine subgroup may be primary, secondary or tertiary amines, for example mono-, di- and trialkylamines, the alkyl radicals of which can be straight-chain or branched, saturated or unsaturated and partly halogenated or perfluorinated, and the alkyl radicals of which can also carry other functional groups, such as, for example, hydroxyl groups. Suitable amine compounds can also be, for example, amines which, in addition to being substituted by alkyl radicals, are also partly substituted by oxyalkylene groups. Examples of monoamine compounds include $C_8$- to $C_{12}$-alkylamines, such as, in particular, nonylamine, octylamine or 2-ethylhexylamine; fluoroamines of the general formula $R_F-X-NR^1R^2$, wherein $R_F$ denotes a perfluorinated alkyl radical having up to 20 carbon atoms, X denotes a saturated or unsaturated, optionally partly halogenated $C_1$- to $C_5$-alkylene radical and $R^1$ and/or $R^2$ denote hydrogen, lower alkyl radicals (i.e. $C_1$- to $C_4$-alkyl radicals) or lower alkyl radicals substituted by hydroxyl groups, for example, fluoroamines such as, in particular, $R_FC_2H_4NH_2$, $R_FC_2H_4N(C_2H_5)_2$, $R_FCF=CH-CH_2N(C_2H_5)_2$, $R_FC_2H_4NHC_2H_4OH$, $R_FCF=CH-CH_2NHC_2H_4OH$, $R_FC_2H_4N(C_2H_4OH)_2$ and $R_FCF=CHCH_2N(C_2H_4OH)_2$; and oxyalkyl substituted amines corresponding to the general formula

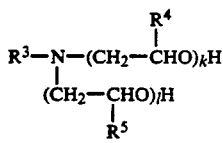

wherein $R^3$ denotes a $C_6$- to $C_{20}$-alkyl radical, $R^4$ and $R^5$ individually denote hydrogen or methyl, and k and l individually represent integers from 1 to 5.

Surface-active ammonium compounds within the scope of the invention are also derived, for example, from the monoamine compounds. These ammonium compounds can be on the one hand salts of the primary, secondary and tertiary amines described above with inorganic acids. On the other hand, the amine compounds can also be quaternary ammonium salts, the nitrogen atom of which is substituted by four organic radicals. Such quaternary ammonium compounds satisfy, for example, the general formula $R_2N^+R'_2$, wherein R denotes a $C_6$- to $C_8$-alkyl radical and R' denotes a $C_1$- to $C_2$-alkyl radical. Other quaternary ammonium compounds are also partly substituted by oxyalkyl groups, in addition to being substituted by alkyl radicals, and satisfy, for example, the general formula

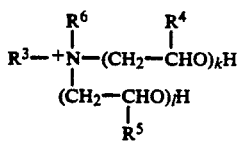

wherein $R^3$ denotes a $C_6$- to $C_{20}$-alkyl radical, $R^6$ denotes a $C_1$- to $C_{10}$-alkyl radical, $R^4$ and $R^5$ individually denote hydrogen or methyl, and k and l individually represent integers from 1 to 5.

In the diamine compound subgroup of of the surface-active organic amine compounds within the scope of the invention, the two amino groups contained in these compounds can be linked by an alkylene chain having up to 20 carbon atoms. The two amino groups of the diamine compound can in each case be primary, secondary or tertiary amino groups. Such diamine compounds correspond, for example, to general formula

wherein Y denotes a $C_4$- to $C_{20}$-alkylene chain and $R^7$, $R^8$, $R^9$ and $R^{10}$ individually represent hydrogen, $C_1$- to $C_6$-alkyl radicals or ethoxy-substituted $C_1$- to $C_6$-alkyl radicals. Examples of such diamine compounds include, in particular, 1,4-butanediamine, 1,6-hexanediamine and 1,12-dodecanediamine. Other suitable diamine compounds correspond, for example, to the general formula

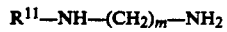

wherein m represents an integer from 1 to 9, and $R^{11}$ denotes an aliphatic, optionally saturated, $C_1$- to $C_{25}$-alkyl radical. Examples of such diamine compounds include, in particular, oleylamino-propylenamine, stearylamino-propylenamine and palmitylamino-propylenamine.

Surface-active monoamide compounds within the scope of the invention can also be derived, for example, from the diamine compounds. Such monoamide compounds correspond, for example, to the general formula

wherein $R_F$ denotes a perfluorinated alkyl radical having up to 20 carbon atoms, Z denotes sulfonyl or carbonyl, $R^{12}$ and/or $R^{13}$ denote lower alkyl radicals (i.e. $C_1$- to $C_4$-alkyl radicals) and n and o individually represent integers from 1 to 5. Examples of such surface-active monoamide compounds include, in particular, the compounds $R_FC_2H_4SO_2NHCH_2CH_2CH_2N(CH_3)_2$, $R_FC_2H_4CONHCH_2CH_2CH_2N(CH_3)_2$, $R_FSO_2NHCH_2CH_2CH_2N(CH_3)_2$ and $R_FCONHCH_2CH_2CH_2N(CH_3)_2$.

The surface-active amide compounds useful in the invention also include diamide compounds, which correspond, for example, to the general formula

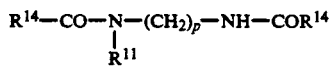

wherein $R^{11}$ denotes an aliphatic, optionally unsaturated $C_1$- to $C_{25}$-alkyl radical, $R^{14}$ denotes an aliphatic $C_{10}$- to $C_{30}$-alkyl radical having a double bond and p represents an integer from 1 to 9. Examples of such diamide compounds include dioleyl-oleylamidopropylenamide, diundecylenyl-oleylamidopropylenamide, dioleyl-stearylamido-propylenamide, dioleylpalmitylamido-propylenamide and dilinoleyl-oleylamido-propylenamide.

The surface-active organic acids within the scope of the invention include dicarboxylic acids $HOOC-(CH_2)_q-COOH$, where q is an integer from 1 to 10; monocarboxylic acids $R^{15}-COOH$, organic sulfonic acids $R^{15}-SO_3H$ and monoesters of sulfuric acid $R^{15}-O-SO_3H$, wherein $R^{15}$ represents a saturated or unsaturated $C_1$- to $C_{20}$-alkyl radical which is optionally substituted by hydroxyl groups or $R^{15}$ represents a $C_7$- to $C_{26}$-alkylphenyl radical. Examples of such surface-active organic acids include, for example, malonic acid, succinic acid, dodecanedioic acid and the like; $C_8$- to $C_{12}$-carboxylic acids, such as, in particular, octanoic acid and nonanoic acid; fatty acids, such as oleic acid, stearic acid and palmitic acid; and alkylsulfonic acids, such as alkylbenzenesulfonates.

The surface-active phosphoric acid esters within the scope of the invention include phosphoric acid monoesters, diesters and triesters, i.e. phosphoric acid compounds in which one, two or all three hydroxyl groups of phosphoric acid are esterified by identical or different, unbranched or branched, saturated or unsaturated alkyl groups, by aryl groups, by alkyl-substituted aryl groups, by oxyalkylene groups, or by oxyalkylene groups which are modified by monocyclic aromatic groups. Such phosphoric acid esters correspond, for example, to the general formula $$(R^{16}O)(R^{17}O)(R^{18}O)P=O$$

The radical $R^{16}$ in this formula represents a straight-chain or branched $C_1$- to $C_{20}$-alkyl radical, a $C_7$- to $C_{26}$-alkylphenyl radical, a phenyl radical, a $C_6$- to $C_{12}$-ethoxyalkyl radical, an oxyalkylene radical, or an oxyalkylene radical modified by a monocyclic aromatic group corresponding to the formula $-T-(OC_rH_{2r})_s-OH$, in which T contains up to 40 carbon atoms and represents a saturated or unsaturated alkylene radical, an arylene radical or a divalent aliphatic-aromatic radical; s is an integer between 2 and 30; and r is 2, 3 or 4. In the case of phosphoric acid monoesters, the radicals $R^{17}$ and $R^{18}$ both denote hydrogen, and in the case of phosphoric acid triesters, the radicals $R^{17}$ and $R^{18}$ independently of one another have the meaning of $R^{16}$. In the case of phosphoric acid diesters, one of the radicals $R^{17}$ and $R^{18}$ denotes hydrogen and the remaining radical has the meaning of $R^{16}$. Examples of suitable surface-active phosphoric acid esters include, in particular, butyl phosphate, octyl phosphate, decyl phosphate, 2-ethylhexyl phosphate, didecyl phosphate, didodecyl phosphate, di-(3,6-dioxapentadecyl) phosphate, tri-(2-ethylhexyl) phosphate, tri-n-butyl phosphate, triphenyl phosphate or diphenyl 2-ethylhexyl phosphate.

Another group of surface-active substances within the scope of the invention are salts of a) surface-active organic amine, ammonium or amide compounds with b) surface-active organic acids or phosphoric acid monoesters or diesters. These salts can be, for example, combinations of the diamines of the formula $R^7R^8N-Y-NR^9R^{10}$ described above and the phosphoric acid monoesters or diesters of the formula $(R^{16}O)(R^{17}O)(R^{18}O)P=O$ described above, where $R^{17}$ is hydrogen. Examples of such salts include, in particular, 1,12-dodecanediammonium bis-(decyl phosphate), 1,12-dodecanediammonium bis-(didodecyl phosphate), 1,6-hexanediammonium bis-(2-ethylhexyl phosphate), 1,1,2-dodecanediammonium bis-(di-3,6-dioxapentadecyl phosphate), 1,4-butanediammonium bis-(di-3,6-dioxapentadecyl phosphate), 1-aminododecyl-12-ammonium didecyl phosphate, 1-amino-dodecyl-12-ammonium didodecyl phosphate, 1-aminododecyl-12-ammonium (di-3,6-dioxapentadecyl phosphate) and 1-aminohexyl-6-ammonium didodecyl phosphate. The salts can furthermore also be combinations of aliphatic $C_{10}$- to $C_{20}$-carboxylic acids having a double bond and either the diamines of the formula $R^{11}-NH-(CH_2)_m-NH$ described above or the diamides of the formula $$R^{14}-CO-N-(CH_2)_p-NH-COR^{14}$$
$$\phantom{R^{14}-CO-N}|\phantom{-(CH_2)_p-NH-COR^{14}}$$
$$\phantom{R^{14}-CO-N}R^{11}$$

described above. Specific examples of these salts include, on the one hand, oleylaminopropylenamine dioleate, oleylaminopropylenaminediundecylenate, stearylaminopropylenamine dioleate, palmitylaminopropylenamine dioleate and oleylaminopropylenamine dilinolate, and on the other hand, dioleyl-oleylamidopropylenamide, diundecylenyl-oleylamidopropylenamide, dioleyl-stearylamidopropylenamide, dioleyl-palmitylamidopropylenamide and dilinoleyl-oleylamidopropylenamide. Other salts of this group of surface-active substances within the scope of the invention correspond to the formula $$R^{19}-COO^- \quad {}^+NH_2-(CH_2)_mNH_3{}^+ \quad {}^-OOC-R^{19}$$
$$\phantom{R^{19}-COO^- \quad {}^+NH_2}|\phantom{-(CH_2)_mNH_3{}^+ \quad {}^-OOC-R^{19}}$$
$$\phantom{R^{19}-COO^- \quad {}^+NH_2}R^{11}$$

wherein $R^{11}$ denotes a saturated or unsaturated aliphatic $C_1$- to $C_{25}$ radical, $R^{19}$ denotes a $C_{10}$- to $C_{30}$-alkyl radical having at least one double bond and additional substitution by a hydroxyl group or an acryl radical, and m represents an integer from 1 to 9. Another group of salts corresponds, for example, to the general formula $$R^{15}OOC-CH-SO_3{}^- \quad {}^+HN-R^{21}$$
$$R^{15}OOC-CH_2 \phantom{-SO_3{}^-} \quad \phantom{{}^+H}R^{22}$$

with $R^{20}$ on the nitrogen.

wherein $R^{15}$ represents a saturated or unsaturated $C_1$- to $C_{20}$-alkyl radical which is optionally substituted by hydroxyl groups, or $R^{15}$ represents a $C_7$- to $C_{26}$-alkylphenyl radical, and $R^{20}$, $R^{21}$ and $R^{22}$ individually represent hydrogen or a $C_1$- to $C_{20}$-alkyl radical which is optionally substituted by hydroxyl groups.

In an advantageous embodiment of the invention, compositions are present which contain, as surface-active substances, a mixture of a) a surface-active organic amine compound with b) a surface-active organic acid or with a surface-active phosphoric acid ester in a molar ratio of a:b from 0.3:0.7 to 0.55:0.45.

In particularly advantageous embodiments of the invention, the compositions contain, as the surface-active organic amine compound, a straight-chain or branched $C_8$- to $C_{12}$-alkylamine. Particularly preferred amines include nonylamine, octylamine or 2-ethylhexylamine.

In another advantageous embodiment of the compositions according to the invention, the compositions contain, as the surface-active substance, an organic acid which is a $C_8$- to $C_{12}$-carboxylic acid, preferably octanoic acid.

In another advantageous embodiment of the compositions according to the invention, the compositions contain, as surface-active substances, phosphoric acid esters which are alkyl, aryl or aryl-alkyl phosphates. Particularly preferred phosphoric acid esters include, for example, tri-(2-ethylhexyl) phosphate, tri-n-butyl phosphate, triphenyl phosphate or diphenyl-(2-ethylhexyl) phosphate.

The compositions according to the invention described above are liquid homogeneous compositions which are unusually effective in removing water from surfaces of objects. The invention thus furthermore relates to a process for removing water from surfaces of objects using the compositions according to the invention comprising treating the surfaces to be dried with any of the compositions described above.

The invention provides compositions which are particularly suitable for removing water from surfaces of solid objects. The surfaces to be treated, which are moist, water-wet and/or covered with liquid water, can be freed from the adhering water (i.e. dried) particularly well by treatment with the compositions according to the invention. The surfaces can be brought into contact with the compositions according to the invention by spraying, brushing on or applying the composition in another manner, by passing the composition over the surfaces or by dipping the objects into the composition. If dipping techniques are used, the composition can be agitated thoroughly or stirred in a suitable manner or assisted in its action in another manner, for example by ultrasound.

Water can be removed at temperatures from above the freezing point of water up to the boiling point of the composition and/or the temperature at which water is still in the liquid state. The treatment time is not particularly critical, since a considerable amount of water is already removed from the surfaces after initial contact of the surfaces with the compositions according to the invention. For practical purposes, it is usually advisable for the surfaces to be dried to be in contact with the composition for about 1 minute, although longer or shorter times can also be used, depending on the particular surfaces of the objects to be dried and on the particular circumstances of the drying operation. The solid object is usually rinsed with fresh, liquid and/or vaporous 1-chloro-2,2,2-trifluoroethyl difluoromethyl ether after the drying operation. If desired, it can also be rinsed with a hydrogen-containing fluorochlorohydrocarbon (for example a dichlorotrifluoroethane, a dichloromonofluoroethane or a dichloropentafluoroethane and the like) and/or if appropriate another non-aqueous solvent which is inert towards the surfaces. Preferably, however, the object is rinsed with 1-chloro-2,2,2-trifluoroethyl difluoromethyl ether. In this process, any substances remaining on the surfaces or surface-active substances may also be removed. Finally, if desired, adhering solvent can be removed from the surfaces of the objects by conventional techniques, for example by evaporation, after the drying operation.

The compositions according to the invention meet all the criteria for a good composition for removing water from surfaces. They thus allow effective drying of objects of the most diverse materials They are equally suitable for objects of metal, glass, fireproof materials, precious stones or conventional plastics. The removal of water is effected as quickly and as completely as possible. The compositions do not form emulsions with water and they allow rapid formation of a separate water and solvent phase. This criterion is very important, since if an emulsion forms, on the one hand water becomes enriched in the compositions and on the other hand some of the composition could be diverted out of the drying stage with the water to be removed, and the phase separation of water and solvent would thereby be made more difficult. Finally, the compositions according to the invention are stable over a long period of use, i.e. they do not become depleted, or become depleted to only a minor extent, in the surface-active substances contained in the 1-chloro-2,2,2-trifluoroethyl difluoromethyl ether. The surface-active substances are not extracted, or hardly extracted at all, from the 1-chloro-2,2,2-trifluoroethyl difluoromethyl ether by the water to be removed, since the affinity of 1-chloro-2,2,2-trifluoroethyl difluoromethyl ether, especially for the preferred surface-active substances, is greater than the affinity of the water for these surface-active substances. The compositions according to the invention furthermore have no flash points.

The invention will be illustrated in further detail hereinafter with reference to the following non-limiting examples.

EXAMPLES

Drying experiments were carried out with objects of the most diverse materials in a commercially available 3-chamber drying unit. The 3-chamber drying unit consisted of a drying bath and two rinsing baths positioned successively in cascade form towards the drying bath, the second rinsing bath being provided with an overflow to the first rinsing bath and the first rinsing bath being provided with an overflow to the drying bath. A common vapor space extended over the three baths, and the vapor space was provided with a cooling zone at the top in order to condense vaporized solvent. The condensate deposited and collected in the cooling zone was recycled into the second rinsing bath via a recycling line. All three chambers of the drying unit were additionally equipped with separate heating devices. The drying bath was connected by an overflow to a water-separating device, in which the drying composition was separated from accumulated water. After the water had been separated, the drying composition was recycled by means of a pump from the water-separating device to the drying bath via a recycling line.

For the drying operation, the objects were first dipped for 1 minute into the drying bath containing boiling drying composition. After drying in the drying bath, the object to be dried was rinsed by being dipped for one minute in each of the two rinsing baths, each containing boiling 1-chloro-2,2,2-trifluoroethyl difluoromethyl ether. After a residence time in the vapor phase of 1 minute, the object to be dried left the unit in an absolutely dry state and cool enough to be able to be touched.

The drying bath and rinsing bath compositions, the drying conditions, the nature of the object to be dried and the drying results are shown in the following table. In this table, the term "isoflurane" refers to 1-chloro-2,2,2-trifluoroethyl difluoromethyl ether.

| Compositions | Drying Conditions | Material | Result |
|---|---|---|---|
| Example 1: | | | |
| Drying Bath 1 | 1) dipped 1 minute at boiling | a) glass lenses | absolutely dry |
| 99.5 wt % isoflurane; 0.5 wt % surface active mixture of octanoic acid (0.6 mole) and octylamine (0.4 mole) | 2) dipped 1 minute at boiling | b) silicon discs | absolutely dry |
| Rinsing Baths 2 & 3 isoflurane | 3) dipped 1 minute at boiling | c) aluminum sheets | absolutely dry |
| Vapor Space 4 isoflurane | 4) residence time in vapor space 1 min. | d) polyethylene plastic components | absolutely dry |
| Example 2: | | | |

| Compositions | Drying Conditions | Material | Result |
|---|---|---|---|
| Drying Bath 1 | 1) dipped 1 minute at boiling | a) glass lenses | absolutely dry |
| 99.5 wt % isoflurane; 0.5 wt % surface active mixture of tri-n-butyl phosphate (0.6 mole) and octylamine. (0.4 mole) | 2) dipped 1 minute at boiling | b) silicon discs | absolutely dry |
| | 3) dipped 1 minute at boiling | c) aluminum sheets | absolutely dry |
| Rinsing Baths 2 & 3 isoflurane | | | |
| Vapor Space 4 isoflurane | 4) residence time in vapor space 1 min. | d) polyethylene plastic components | absolutely dry |
| Example 3: | | | |
| Drying Bath 1 | 1) dipped 1 minute at boiling | a) glass lenses | absolutely dry |
| 99.5 wt % isoflurane; 0.5 wt % surface active mixture of triphenyl phosphate (0.6 mole) and 2-ethylhexylamine (0.4 mole) | 2) dipped 1 minute at boiling | b) silicon discs | absolutely dry |
| | 3) dipped 1 minute at boiling | c) aluminum sheets | absolutely dry |
| Rinsing Baths 2 & 3 isoflurane | | | |
| Vapor Space 4 isoflurane | 4) residence time in vapor space 1 min. | d) polyethylene plastic components | absolutely dry |
| Example 4: | | | |
| Drying Bath 1 | 1) dipped 1 minute at boiling | a) glass lenses | absolutely dry |
| 99.5 wt % isoflurane; 0.5 wt % surface active mixture of octanoic acid (0.45 mole) and octylamine (0.55 mole) | 2) dipped 1 minute at boiling | b) silicon discs | absolutely dry |
| | 3) dipped 1 minute at boiling | c) aluminum sheets | absolutely dry |
| Rinsing Baths 2 & 3 isoflurane | | | |
| Vapor Space 4 isoflurane | 4) residence time in vapor space 1 min. | d) polyethylene plastic components | absolutely dry |
| Example 5: | | | |
| Drying Bath 1 | 1) dipped 1 minute at boiling | a) glass lenses | absolutely dry |
| 99.5 wt % isoflurane; 0.5 wt % surface active mixture of isooctanoic acid (0.6 mole) and tert-octylamine (0.4 mole) | 2) dipped 1 minute at boiling | b) silicon discs | absolutely dry |
| | 3) dipped 1 minute at boiling | c) aluminum sheets | absolutely dry |
| Rinsing Baths 2 & 3 isoflurane | | | |
| Vapor Space 4 isoflurane | 4) residence time in vapor space 1 min. | d) polyethylene plastic components | absolutely dry |
| Example 6: | | | |
| Drying Bath 1 | 1) dipped 1 minute at boiling | a) glass lenses | absolutely dry |
| 99.5 wt % isoflurane; 0.5 wt % surface active mixture of isooctanoic acid (0.6 mole) and nonylamine (0.4 mole) | 2) dipped 1 minute at boiling | b) silicon discs | absolutely dry |
| | 3) dipped 1 minute at boiling | c) aluminum sheets | absolutely dry |
| Rinsing Baths 2 & 3 isoflurane | | | |
| Vapor Space 4 isoflurane | 4) residence time in vapor space 1 min. | d) polyethylene plastic components | absolutely dry |
| Example 7: | | | |
| Drying Bath 1 | 1) dipped 1 minute at boiling | a) glass lenses | absolutely dry |
| 99.5 wt % isoflurane; 0.5 wt % surface active mixture of 2-ethylhexanoic acid (0.6 mole) and tert-octylamine (0.4 mole) | 2) dipped 1 minute at boiling | b) silicon discs | absolutely dry |
| | 3) dipped 1 minute at boiling | c) aluminum sheets | absolutely dry |
| Rinsing Baths 2 & 3 isoflurane | | | |
| Vapor Space 4 isoflurane | 4) residence time in vapor space 1 min. | d) polyethylene plastic components | absolutely dry |
| Example 8: | | | |
| Drying Bath 1 | 1) dipped 1 minute at boiling | a) glass lenses | absolutely dry |
| 99.5 wt % isoflurane; 0.5 wt % surface active mixture of 2-ethylhexanoic acid (0.6 mole) and nonylamine (0.4 mole) | 2) dipped 1 minute at boiling | b) silicon discs | absolutely dry |
| | 3) dipped 1 minute at boiling | c) aluminum sheets | absolutely dry |
| Rinsing Baths 2 & 3 isoflurane | | | |
| Vapor Space 4 isoflurane | 4) residence time in vapor space 1 min. | d) polyethylene plastic components | absolutely dry |
| Example 9: | | | |
| Drying Bath 1 | 1) dipped 1 minute at boiling | a) glass lenses | absolutely dry |
| 99.5 wt % isoflurane; 0.5 wt % surface active mixture of nonanoic acid (0.6 mole) and tert-octylamine (0.4 mole) | 2) dipped 1 minute at boiling | b) silicon discs | absolutely dry |
| | 3) dipped 1 minute at boiling | c) aluminum sheets | absolutely dry |
| Rinsing Baths 2 & 3 isoflurane | | | |
| Vapor Space 4 isoflurane | 4) residence time in vapor space 1 min. | d) polyethylene plastic components | absolutely dry |
| Example 10: | | | |
| Rinsing Bath 1 | 1) dipped 1 minute at boiling | a) glass lenses | absolutely dry |
| 99.5 wt % isoflurane; 0.5 wt % surface active mixture of nonanoic acid (0.6 mole) and nonylamine (0.4 mole) | 2) dipped 1 minute at boiling | b) silicon discs | absolutely dry |
| | 3) dipped 1 minute at boiling | c) aluminum sheets | absolutely dry |
| Rinsing Baths 2 & 3 isoflurane | | | |
| Vapor Space 4 isoflurane | 4) residence time in vapor space 1 min. | d) polyethylene plastic components | absolutely dry |

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A drying composition consisting essentially of
   99.99 to 90% by weight of 1-chloro-2,2,2-trifluoroethyl difluoromethyl ether and
   0.01 to 10% by weight of at lest one surface-active agent dissolved in said ether,
   the sum of the constituents being 100% by weight.

2. A composition according to claim 1, which contains 99.95 to 95% by weight of 1-chloro-2,2,2-trifluoroethyl difluoromethyl ether and 0.05 to 5% by weight of said surface-active agent.

3. A composition according to claim 1, wherein said surface-active agent is selected from the group consisting of surface-active organic amine, ammonium and amide compounds; surface-active organic acids; surface-active phosphoric acid esters; salts of a) surface-active organic amine, ammonium or amide compounds with b) surface-active organic acids or phosphoric acid mono- or diesters; and mixtures thereof.

4. A composition according to claim 1, wherein said surface-active agent consists of a mixture of
   a) an organic amine compound with
   b) an organic acid or a phosphoric acid ester, in an a:b molar ratio of 0.3:0.7 to 0.55:0.45.

5. A composition according to claim 4, wherein said organic amine compound is a straight-chain or branched $C_8$- to $C_{12}$-alkylamine.

6. A composition according to claim 5, wherein said alkylamine is selected from the group consisting of nonylamine, octylamine, and 2-ethylhexylamine.

7. A composition according to claim 4, wherein component b) is a $C_8$- to $C_{12}$-carboxylic acid.

8. A composition according to claim 7, wherein said carboxylic acid is octanoic acid.

9. A composition according to claim 4, wherein component b) is an alkyl, aryl or arylalkyl phosphate corresponding to the formula:

$$(R^{16}O)(R^{17}O)(R^{18}O)P=O$$

wherein $R^{16}$, $R^{17}$ and $R^{18}$ are independently selected from the group consisting of hydrogen, straight-chain or branched $C_1$- to $C_{20}$-alkyl radicals, $C_7$- to $C_{26}$-alkylphenyl radicals, phenyl radicals, $C_6$- to $C_{12}$-ethoxyalkyl radicals, oxyalkylene radicals, and oxyalkylene radicals modified by a monocyclic aromatic group corresponding to the formula $-T-(OC_rH_{2r})_s-OH$, in which T contains up to 40 carbon atoms and represents a saturated or unsaturated alkylene radical, an arylene radical or a divalent aliphatic-aromatic radical; s is an integer between 2 and 30; and r is 2, 3 or 4; at least one of $R^{16}$, $R^{17}$ and $R^{18}$ being other than hydrogen.

10. A composition according to claim 9, wherein said phosphate is selected from the group consisting of tri-(2-ethylhexyl) phosphate, tri-n-butyl phosphate, triphenyl phosphate, and diphenyl-2-ethylhexyl phosphate.

11. A process for removing water from a surface of an object, said process comprising treating said surface with a drying composition consisting essentially of
   99.99 to 90% by weight of 1-chloro-2,2,2-trifluoroethyl difluoromethyl ether and
   0.01 to 10% by weight of at least one surface-active agent dissolved in said ether,
the sum of the constituents being 100% by weight.

* * * * *